Dec. 19, 1922. Re. 15,506
L. DAVID.
ELECTRIC HAIR CLIPPER.
FILED OCT. 25, 1922.
Fig. 1.
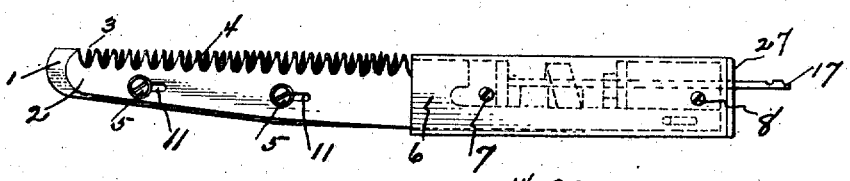
Fig. 2.
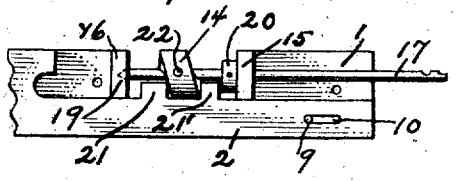
Fig. 3.
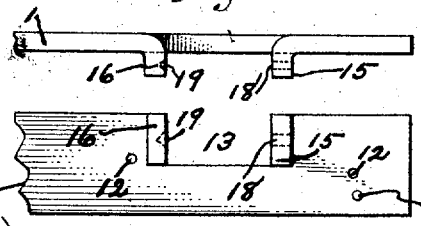
Fig. 4.
Fig. 5.
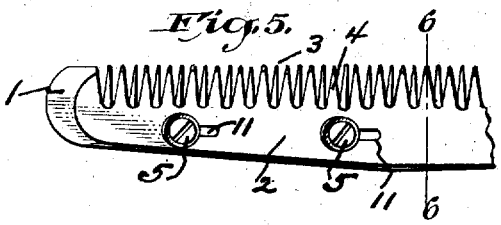
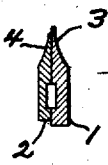
Fig. 6.
Fig. 8.
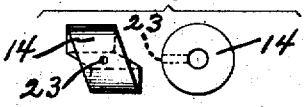
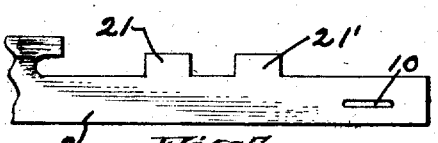
Fig. 7.
Inventor:
Leoncio David Reissued Dec. 19, 1922. Re. 15,506

UNITED STATES PATENT OFFICE.

LEONCIO DAVID, OF WASHINGTON, DISTRICT OF COLUMBIA, ASSIGNOR OF ONE-HALF RENE G. DE TONNANCOUR, OF FALL RIVER, MASSACHUSETTS.

ELECTRIC HAIR CLIPPER.

Original No. 1,423,756, dated July 25, 1922, Serial No. 538,013, filed February 20, 1922. Application for reissue filed October 25, 1922. Serial No. 596,891.

*To all whom it may concern:*

Be it known that LEONCIO DAVID, a citizen of the Philippine Islands, residing at Washington, District of Columbia, has invented certain new and useful Improvements in Electric Hair Clippers, of which the following is a specification.

My invention relates to hair cutters, and more particulary to motor driven hair cutters or clippers for use by barbers.

The object of my invention is to provide a device of this character which will by reason of the tapering feature thereof, permit of free and easy access to the sides of the head between the ears of a person, and be inexpensive to manufacture.

Other and further objects and advantages of the invention will be in part described and in part obvious as the specification is proceeded with.

In the accompanying drawings forming part of this specification:

Figure 1 is a side elevation of the invention;

Figure 2 is a fragmental detail view of the two knives with the handle removed;

Figure 3 is a top plan view of one of the knives;

Figure 4 is a face and end view combined of the knife shown in Figure 3;

Figure 5 is an enlarged fragmental view of the two knives;

Figure 6 is a section on line 6—6 of Figure 5;

Figure 7 is a fragmental view of one of the knives; and

Figure 8 is a detail view of the cam.

Referring more particularly to the drawings, 1 designates a fixed and 2 a movable blade provided with coacting cutting teeth 3 and 4 respectively. These blades are connected together at their forward ends, with freedom for relative sliding movement, by means of screws 5, carried by the blade 1 and projecting through slots 11 in the blade 2, spring washers 6 being employed to reduce vibration and consequently chattering. The opposite ends of the blades 1 and 2 are enclosed within a combined housing and handle 6, and the blade 1 is fixed to the housing by means of screws 7 and 8 which pass through the sides of the housing, it being noted that the screws 7 and 8 pass above the cut away or reduced rear portion of the movable blade 2 and thence into screw openings 12 in the blade 1. A pin 9 carried by the blade 1 projects through a short slot 10 in the blade 2 and serves to guide as well as limit the movement of the latter blade.

The blade 1 is formed with a comparatively large opening 13 formed by cutting away the top edge of the blade to accommodate a drive wheel or cam 14 presently to be referred to in more detail. The blade 1 is also formed with inwardly extending lugs or flanges 15 and 16 which serve as bearings for a longitudinally extending shaft 17. This shaft, which is adapted to be connected to a suitable source of power (not shown) passes through the end wall 27 of the housing 6, thence through the opening 18 in the flange 15, and into the recess 19 in the flange 16. A collar 20 fixed to the shaft prevents withdrawal.

The blade 2, as previously stated, is cut away or reduced at its rear portion. The upper edge of this reduced portion is formed with a pair of spaced upwardly projecting lugs 21 and 21′ between which the drive wheel or cam 14 operates, the latter being fixed to the shaft 17 by means of a pin 22 passing through opening 23 in the cam.

This cam 14 is of spiral shape to the end that, when the shaft 17 is rotated, the movable blade 2 will be caused to reciprocate, it being understood that as the cam rotates, it first engages the lug 21 with its forward face to move the blade forward, and then engages the lug 21′ with its rear face thus moving the blade rearwardly. This reciprocatory movement of the blade is accomplished with little or no vibration or jarring due to the uniform action of the spiral cam.

Having thus described my invention:

What I claim is:

1. A hair clipper comprising a pair of juxtaposed blades secured together for relative longitudinal movement, one of said blades having inturned flanges, a drive shaft journaled in said flanges, a drive cam on said shaft, means on the other of said blades engaged by said cam, whereby said last mentioned blade is reciprocated when said shaft is rotated.

2. A hair clipper comprising a pair of juxtoposed blades secured together for relative longitudinal movement, one or said blades having inturned flanges, a drive shaft journaled in said flanges, a drive cam on said shaft, lugs on the other of said blades engaged by said cam, whereby said last mentioned blade is reciprocated when said shaft is rotated.

3. A hair clipper comprising a pair of juxtaposed blades secured together for relative longitudinal movement, each of said blades being solid for the full length of the clipper, each of said blades tapering on a graduated scale toward its forward end, one of said blades having inturned flanges, a drive shaft journaled in said flanges, a drive cam on said shaft, means on the other of said blades engaged by said cam, whereby said last mentioned blade is reicprocated when said shaft is rotated.

4. A hair clipper comprising a pair of juxtaposed blades secured together for relative longitudinal movement, inward flanges for the support of a drive shaft, a drive shaft journaled in said flanges, a drive cam on said shaft, means on one of said blades engaged by said cam, whereby such blade is reciprocated when said shaft is rotated.

5. A hair clipper comprising a pair of superposed blades having means to maintain them slidably in cooperative cutting relation, one of said blades having a supporting portion provided with bearings, a shaft journaled in said bearings, a cam secured on the shaft between said bearings, the other blade having a portion carrying means to engage the cam whereby rotation of the shaft will produce relative reciprocation of the blades, combined handle and housing plates secured to the supporting portion aforesaid whereby a convenient, effective and compact device is produced.

In testimony whereof I affix my signature.

LEONCIO DAVID.